(12) United States Patent
Alter et al.

(10) Patent No.: US 10,318,565 B2
(45) Date of Patent: Jun. 11, 2019

(54) METHOD AND SYSTEM FOR SEARCHING PHRASE CONCEPTS IN DOCUMENTS

(71) Applicant: OPISOFTCARE LTD., Tel-Aviv (IL)

(72) Inventors: Alon Alter, Raanana (IL); Oksana Tozhovez, Petah-Tiqwa (IL)

(73) Assignee: OPISOFTCARE LTD., Tel-Aviv (IL)

( * ) Notice: Subject to any disclaimer, the term of this patent is extended or adjusted under 35 U.S.C. 154(b) by 284 days.

(21) Appl. No.: 15/502,089

(22) PCT Filed: Aug. 10, 2015

(86) PCT No.: PCT/IL2015/000037
§ 371 (c)(1),
(2) Date: Feb. 6, 2017

(87) PCT Pub. No.: WO2016/024261
PCT Pub. Date: Feb. 18, 2016

(65) Prior Publication Data
US 2017/0228456 A1 Aug. 10, 2017

Related U.S. Application Data

(60) Provisional application No. 62/037,466, filed on Aug. 14, 2014.

(51) Int. Cl.
*G06F 17/30* (2006.01)
*G06F 16/33* (2019.01)
*G06F 16/31* (2019.01)
*G06F 16/338* (2019.01)
*G06F 17/27* (2006.01)

(52) U.S. Cl.
CPC ........ *G06F 16/3343* (2019.01); *G06F 16/316* (2019.01); *G06F 16/334* (2019.01); *G06F 16/338* (2019.01); *G06F 16/3344* (2019.01); *G06F 17/271* (2013.01); *G06F 17/274* (2013.01); *G06F 17/2785* (2013.01); *G06F 17/30619* (2013.01); *G06F 17/30675* (2013.01); *G06F 17/30681* (2013.01); *G06F 17/30684* (2013.01); *G06F 17/30696* (2013.01)

(58) Field of Classification Search
CPC ......... G06F 17/30619; G06F 17/30675; G06F 17/30681; G06F 17/30684; G06F 17/30696
USPC ....................................... 707/730
See application file for complete search history.

*Primary Examiner* — Joshua Bullock
(74) *Attorney, Agent, or Firm* — The Law Office of Michael E. Kondoudis

(57) ABSTRACT

A system and method for fast concept search in multiple documents where the concept is expressed by plurality of words, all of which have to be in the same sentence and within specified range. The system automatically finds equivalent expressions of the same concept, and returns as search results all documents in which the concept is contained.

8 Claims, 2 Drawing Sheets

METHOD AND SYSTEM FOR SEARCHING PHRASE CONCEPTS IN DOCUMENTS

FIELD OF THE INVENTION

The invention generally relates to the field of information retrieval and more particularly to retrieving answers to the concepts expressed in the search queries

BACKGROUND OF THE INVENTION

In recent years there has been a massive movement towards computerizing medical data for various health service e organizations. However, making doctors write down their examination documents and their diagnostics using specific codes and sentences to write down the prognosis of each patient, will inevitably lower their productivity. Thus, most modern systems designed for computerizing medical data today go the path of natural language processing (NLP), allowing the doctors to write down their prognosis the way they are used to, and using computer analysis to extract vital information such as information about a patient, about illnesses, treatments etc. through the use of natural language processing (NLP).

Naturally, this process presents many problems. One of them is the need to analyze and normalize sentences—for example "there is no sign of a hernia"; This prognosis can be written in many forms in natural language—for example "hernia has been ruled out", or "no apparent sign of a hernia" and so on. These variations appear in different documents, and they all express the same concept.

Most algorithms, such as the ones described in the public Stanford NLP pages and in many patents, refer to web searches. In these cases users fail to choose effective query terms. Often documents that satisfy user's information need may use different words than the query terms. We are interested in professional information retrieval system aimed to be used by professional community, such as health data retrieval system. In this case the query is expressed with the exact terms, but the meaning of the query depends on the whole phrase. In many cases the query defines allowed distances between words, but they do not require that that words in the phrase are in the same sentence. Thus wrong results can be retrieved.

SUMMARY OF THE INVENTION

The disclosed invention assumes that an meaningful information that is searched by a user is expressed in a sentence, thus when a set of keywords are searched for, they are all expected to be in the same sentence. Usually, search engines define maximum distance between the words in the query regardless of the sentence limits. Hence, in the first phase of the processing, each new document that is added to the corpus is analyzed and broken into sentences so that for every word information as to its position in the document and to the sentence in which it appears is kept. In addition to the indexing information, normalized version and phonetic representation of the word are saved.

From the phrase query entered by the user, many search phrases are derived. These search phrases are generated by finding dictionary synonyms to all query words, and retrieving semantic synonyms from an ontology. Phonetic representation is prepared for each word in the derived search phrases. From this data a comprehensive set of logical queries is prepared.

It is an object of the disclosed invention to retrieve maximal set of relevant documents that relates to the query phrase It is another objective of the disclosed invention is to enable a professional user, who is not familiar with complex query structure, to retrieve information he is interested in.

DETAILED DESCRIPTION

The invention will be described more fully hereinafter, with reference to the accompanying drawings, in which a preferred embodiment of the invention is shown. The embodiment refers to a corpus containing medical documents.

The invention may, however, be embodied in many different forms and should not be construed as limited to the embodiment set forth herein; rather this embodiment is provided so that the disclosure will be thorough and complete, and will fully convey the scope of the invention to those skilled in the art.

Before describing the processing that each document goes through, it is important to explain the corpus of the system. The corpus of the system is a database that stores information on each document ever entered the system, documents that constitute the search domain. Among the information on each word the system corpus keeps a list of all words and their locations within the sentences as well as the sentence number within the document where that word is located, referred to as the search indexes. It also contains a phonetic representation for each word as well as statistical information on the word.

Figure 1:
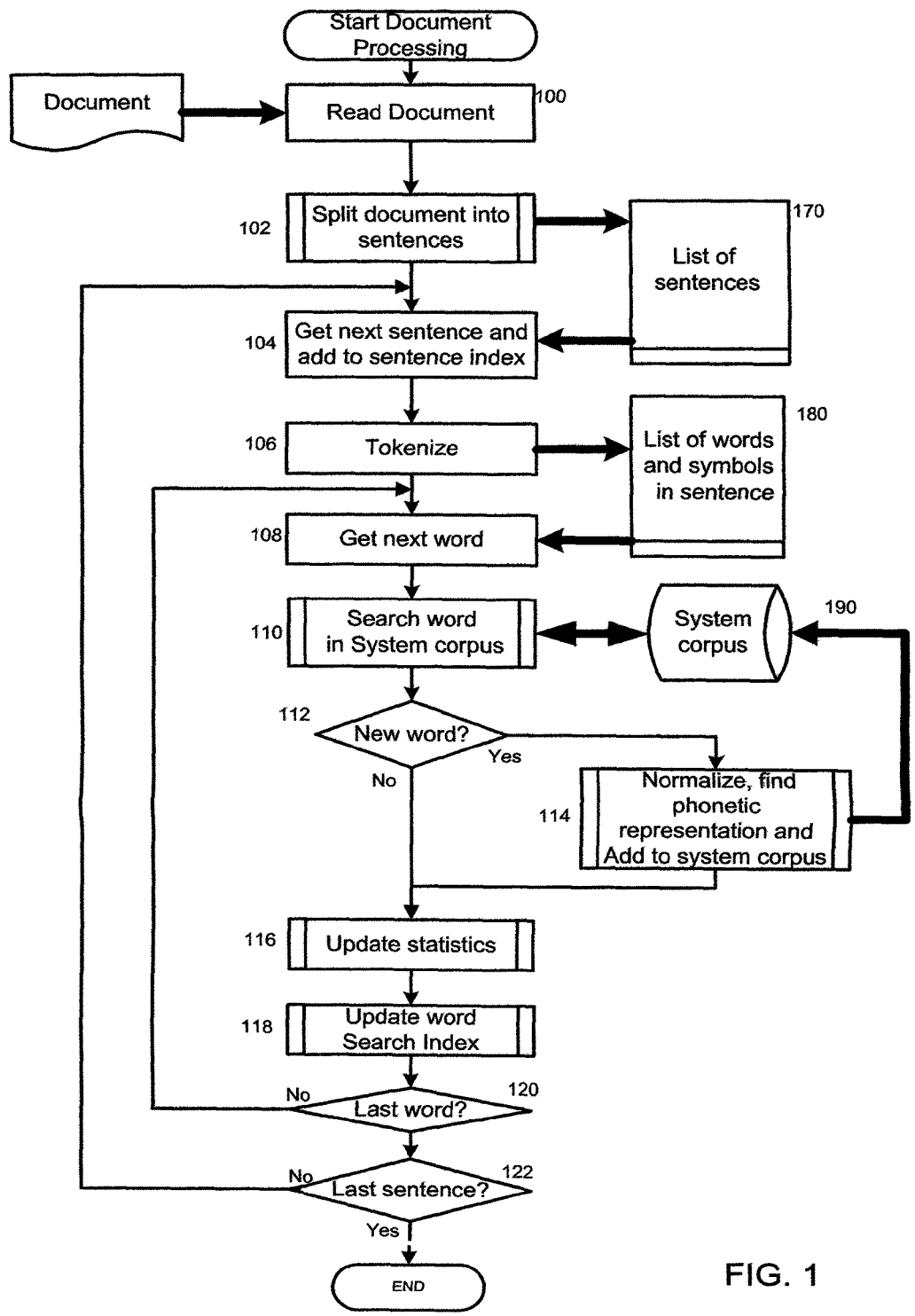
FIG. 1 is a top level flow chart of the search preparation process.

The top level flow chart of the preparation process is shown in FIG. 1. Each new medical document, which is part of the search domain, goes through the preparation process. The system reads a new document in step 100. The document is split into sentences—step 102. The sentences are temporarily saved in a List of Sentences 170. Each sentence is processed by steps 104 to 122.

A sentence is retrieved from the List of Sentences 170 and an index to the sentence is added—step 104. The retrieved sentence is tokenized in step 106 and a temporary List of Words and symbols in the sentence 180 is prepared. Each word in the sentence is processed in steps 108 to 120 as described hereafter.

A new word is retrieved—step 108 from the List of words in a sentence 180. In step 110 the system corpus 190 is searched to find out if the word is already known. If the word is new, as checked in step 112, than the new word is processed in step 114, where it is normalized and goes through phonetic conversion and is added to the corpus—190 and the processing proceeds with step 116. If the retrieved word is not new, processing continues in step 116. In step 116 the statistics related to the word is updated, and the search index of the word in the sentence is updated in step 118.

If the retrieved word was not the last word in the sentence, as tested in step 120, then the processing returns to step 108, where processing of a new word begins. If the retrieved word was the last word in the sentence, then step 122 is executed. If the retrieved sentence was not the last one, then the processing of new sentence is executed, starting with step 104. Otherwise the processing of the new document terminates.

Figure 2:
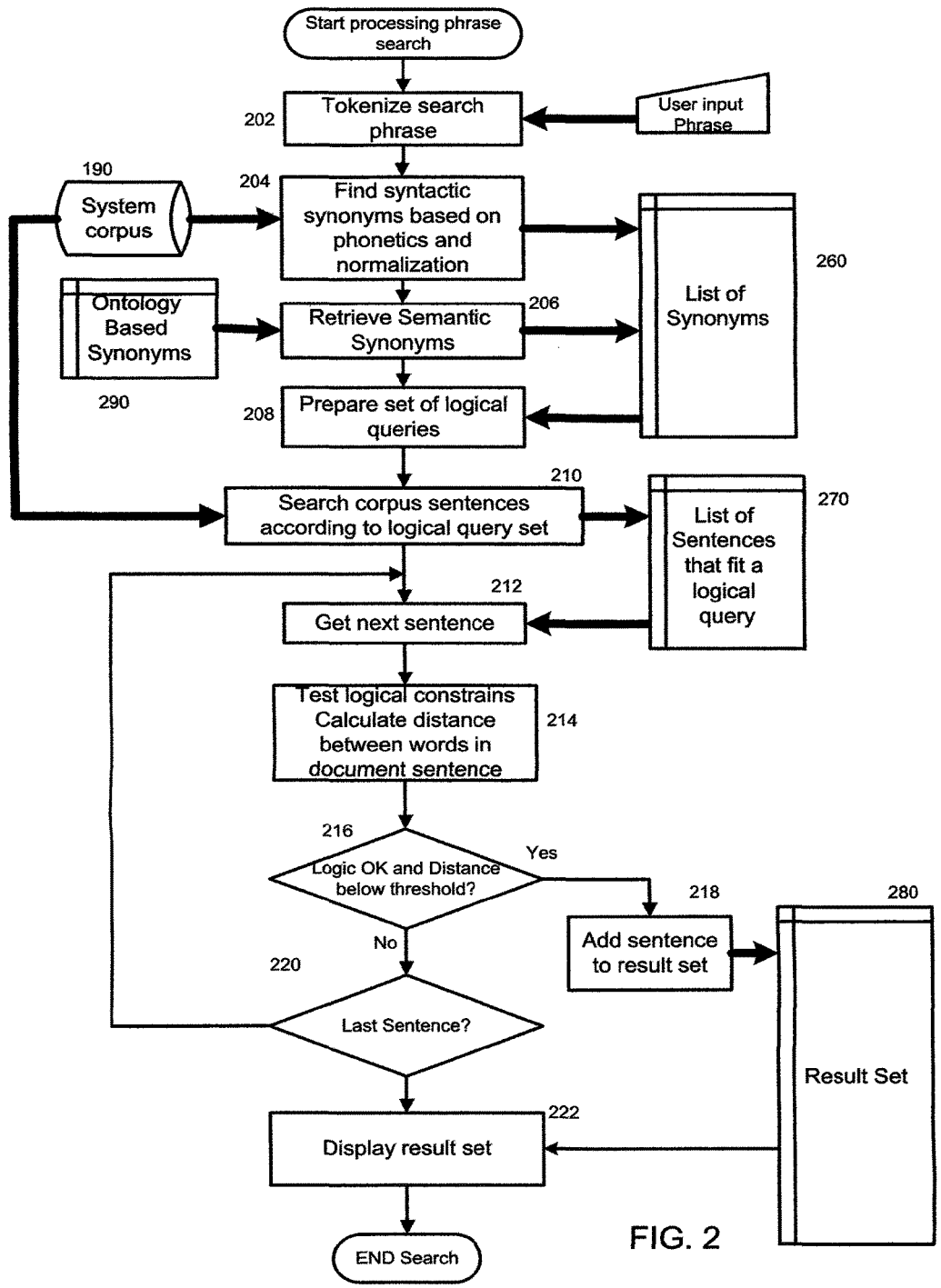
FIG. 2 presents a flow chart of the processing of the query.

FIG. 2 describes the processing of the phrase query. For the purpose of explanation we assume that there are 3 documents in the corpus that contain the following sentences respectively, "there is no sign of Carcinoma", "Carzinoma has been ruled out", and "no apparent sign of cancer". These three sentences clearly express the same idea. The user wants to find out the cases where cancer was suspected but was not found. The professional user enters the query "no carcinoma". These words all have to be in the same sentence, but they do not have to be consecutive. The expression "ruled out" is synonym for "no" and it may appear after the subject "carcinoma" in the sentence and it gives the sentence the same meaning. Skin cancer, carcinoma, SCC are all semantic synonyms, and carcinoma is frequently misspelled as carzinoma, carsinome etc. The process as described hereafter can find all wording combinations that have the same meaning.

The incoming search query is tokenized in step 202. For each word in the query, syntactic synonyms based on phonetic similarity and normalization are generated in step 204 and are temporarily saved in a List of Synonyms 260. The synonyms are looked for in the corpus 190. Referring to the above give example, in this step the words carcinoma, carzinoma, are found because they are similar from phonetic point of view. This similarity is determined by the distance between these words measured by Jaro-Winkler algorithm.

Semantic synonyms for each word in the query are derived in step 206 from an ontology 290, and are added to the List of Synonyms 260. Again, referring to the above given example, in this step the words cancer, SCC are semantic synonyms for carcinoma, and the words ruled-out, without, not and negative are semantic synonyms for "no".

Using the stored list of synonyms 260, in step 208 a set of logical queries is prepared. The query set is comprised of all combinations of search phrases that express the same concept of the query. A search query within the set can include, in addition to the words, also logical constrains such as distance between the words in a sentence, or define that a specific word has to precede another one etc. For example, the query can include multiple phrases with logical operators that determine the relationship between them, e.g. hypertension OR [edema extremities]. Note that every query in the set includes the constraint that the words have to be in the same sentence. In step 210, the set of queries are applied to the documents in the system corpus 190, and a list of all sentences that contain the required words is prepared and these sentences are temporarily saved in a list 270.

A candidate search result sentence saved in the list 270 is popped from the list 270 in step 212. The logical constraints and the distance between words are evaluated in step 216. The maximum distance is checked against predefined threshold. If the logical constraints are met and the distance between the words in the sentence is below the query defined threshold, then the sentence with its relevant data, such as its document number is added—step 218 to the result set 280. When all searched sentences in the list 270 have been processed, the test in step 214 indicates that there is no new sentence, and the search results are displayed to the user—step 222.

What has been described above is just one embodiment of the disclosed innovation. It is of course, not possible to describe every conceivable combination of components and/or methodologies, but one of ordinary skill in the art may recognize that many further combinations and permutations are possible. Accordingly, the innovation is intended to embrace all such alterations, modifications, and variations that fall within the spirit and scope of the appended claims.

Further, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for performing search to retrieve phrase concepts from documents stored in a corpus, the method is comprised of the following steps:
   a. Splitting all documents in the search domain into sentences; splitting each sentence to its words; keeping for each word its phonetic representation and its indexes;
   b. receiving a query regarding the search subject from the user, wherein the logic of the query allows the user to specify that certain search phrases must be found within the boundaries of one sentence;
   c. finding syntactic and semantic synonyms to all words of the query;
   d. preparing set of logical queries for all synonym combinations;
   e. retrieving all sentences that respond to at least one query;
   f. calculating a score for each retrieved sentence, and
   g. displaying documents that contain sentences having a score higher than a predefined threshold.

2. The method according to claim 1 wherein semantic synonyms are derived from an ontology database.

3. The method according to claim 1 wherein the syntactic synonyms are derived from the words stored in the corpus, by finding similar phonetic representation between a word in the query and a word in the corpus and measuring the distance between these two words.

4. The method according to claim 3 wherein Jaro-Winkler algorithm is used to compute the distance between words having similar phonetic representation.

5. The method according to claim 1 wherein the user can update the ontology.

6. The method according to claim 3 wherein the Jaro-Winkler algorithm is adapted to the Hebrew Language.

7. The method according to claim 1 wherein sentence splitting is based on syntactic analysis and noun-phrase analysis.

8. A system comprising one or more computers configured to perform operations for retrieving findings from documents stored in a corpus, operations comprising:
   a. Splitting all documents in the search domain into sentences; splitting each sentence to its words; keeping for each word its phonetic representation and its indexes;
   b. receiving a query regarding the search subject from the user, wherein the logic of the query allows the user to specify that certain search phrases must be found within the boundaries of one sentence;
   c. finding syntactic and semantic synonyms to all words of the query;
   d. preparing set of logical queries for all synonym combinations;
   e. retrieving all sentences that respond to at least one query;
   f. calculating a score for each retrieved sentence, and g. displaying documents that contain sentences having a score higher than a predefined threshold.

* * * * *